3,565,825
SILICONE RUBBER CATALYST SYSTEM
Marvin S. Antelman, Newton, Mass., assignor to Wells-Benrus, Inc., a corporation of Delaware
No Drawing. Continuation-in-part of application Ser. No. 480,180, Aug. 16, 1965. This application June 9, 1969, Ser. No. 831,755
Int. Cl. C08f 31/00
U.S. Cl. 252—431                                            6 Claims

ABSTRACT OF THE DISCLOSURE

A catalyst composition for curing silicone rubber, prepolymers containing a metal carboxylic acid salt dissolved in an isoparaffin solvent.

---

This application is a continuation-in-part of my copending application Ser. No. 480,180, filed Aug. 16, 1965 which has been abandoned.

BACKGROUND OF THE INVENTION

This invention relates to improved silicone rubber catalyst systems for converting a silicone rubber prepolymer to the cured, solid, elastic state. More particularly, the invention relates to improved catalyst systems containing metal salts of carboxylic acids for curing room temperature vulcanizing silicone rubber prepolymers. The catalyst systems of this invention when incorporated into silicone rubber prepolymer mixtures increase the curing rate and lend themselves to easy handling, measurement, and dispersion into the mixture.

In the past various organopolysiloxane curing catalysts have been employed. Most of the prior art curing systems have required the use of temperatures ranging from about 150 to 300° C., and extensive periods of time, in the mold and out of the mold, for heat aging to completely cure the polymer. A few prior art catalyst systems allow room temperature curing or vulcanizing. Of all the catalysts that have been used to cure silicone rubber prepolymers, metal carboxylic acid salts, and especially tin fatty acid salts have been found to be most expedient. Although such metal salt catalysts represent significant improvements over previously used catalysts, they still lack some desirable properties because metal carboxylic acid salts are highly viscous and difficult to mix with silicone rubber prepolymers, and they require relatively more time to cure room temperature curing silicone rubber prepolymers than is desirable.

An important object of this invention is to provide an improved media for dispersing a metal salt of carboxylic acid catalysts into silicone rubber prepolymers so as to render them less viscous and more readily miscible with the silicone components without degrading the physical properties of the ultimate polymer or adversely affecting the catalytic effectiveness of the metal salt catalyst.

Still another object of this invention is to provide a catalyst media that will accelerate the catalytic curing effect of metal salt catalysts on room temperature curing silicones.

Unexpectedly I have discovered that I am able to effect a faster and more uniform cure of organopoly-siloxanes or silicone rubber prepolymers to the solid elastic state by employing in combination (a) a metal fatty acid salt, dissolved in (b) an isoparaffin. This catalyst composition is a vastly improved, faster acting silicone rubber prepolymer catalyst curing system that is much easier to disperse into the silicone rubber prepolymer, less viscous, and more readily miscible with organopolysiloxanes than are prior art metal fatty acid salt silicone rubber prepolymer catalyst compositions.

The isoparaffin component used to dilute the metal fatty acid salts of this invention may be any individual liquid isoparaffin or mixtures of liquid isoparaffins. Although any liquid isoparaffin can be used, the preferred isoparaffins have 10 to 32 carbon atoms per molecule. Such isoparaffins are commercially available. They have highly branched molecular structures, are uniformly pure in isoparaffin type, are free from contaminants, and are available in a selection of volatility grades that cover boiling ranges from about 150 to 500° F. The preferred boiling point range is 380 to 430° F. The preferred isoparaffins have flash points of 120 to 200° F. and the more preferred flash point range is 123 to 193° F.

The metal salts of carboxylic acids which can be employed in the catalyst systems of this invention are known prior art silicone curing catalysts and include the carboxylic acid salts of lead, tin, zirconium, iron, cadmium, titanium, calcium and manganese. While any carboxylic acid can be used the tin salts are preferred. Typical examples of such catalysts are disclosed in U.S. Pats. 2,843,555 and 3,110,689.

The relative amounts of isoparaffin and the metallic salt employed in the catalyst system of the invention may be varied within fairly wide limits. Generally the total composition including the silicone rubber prepolymer should contain between .01 to 5% or preferably 0.1 to 5% by weight metal salt and 0.1 to 70% by weight isoparaffin. The catalyst system may thus be varied between .11 to 75% of the total composition. The metal salt should be completely dissolved in the isoparaffin to facilitate uniform distribution of the catalyst system into the silicone rubber prepolymer.

The silicone rubber prepolymers that can be cured with the catalyst system of this invention can be any silicone rubber prepolymer and the preferred prepolymer is a room temperature vulcanizing silicone rubber prepolymer. Such silicone rubbers are well known in the art and are normally referred to as convertible organopolysiloxanes. Some examples of such convertible organopolysiloxanes are disclosed in U.S. Pats. 2,448,756; 2,448,-556; 2,457,688; 2,541,137 and room temperature curing organopolysiloxanes are specifically disclosed in U.S. Pats. 2,843,555 and 3,110,689.

The properties of the silicone rubber prepolymer may be varied by compounding the prepolymer with various types and amounts of fillers and modifying agents on ordinary rubber compounding rolls, for example, silica, silica aerogel, titanium dioxide, calcium silicate, ferric oxide, chromic oxide, cadmium sulfide, asbestos, glass fibers, calcium carbonate, carbon black, lithopone talc, etc., and molded, extruded, cast or otherwise shaped as by heating under pressure to form products having physical characteristics, e.g., elasticity, compressibility, etc., similar to those of natural rubber and other known synthetic rubbers. Any known silicone rubber modifying agents may be added to the mixture to obtain a desired effect such as color, reinforcing, etc.

In order to prepare the room temperature curing silicone rubber compositions herein described, it is only necessary to mix the catalyst ingredients with the silicone rubber prepolymer, preferably adding the metallic salt and the isoparaffin last, since shortly after incorporation of these last ingredients in the organopolysiloxane curing of the mixture will begin to take place. In a matter of a few minutes a tight cure will begin to be noticed, and within a few more minutes the ultimate cure at room temperature will be attained. The products thus derived have good tensile strengths, elasticity, and can be heated at elevated temperatures of about 150° to 250° C. for extended periods of time without any apparent decrease in their physical properties.

The following examples are given to illustrate the present invention and do not in any way limit it. All parts are by weight.

EXAMPLE I

A 10% solution of catalyst was prepared by dissolving 1 gram of tin octoate catalyst (Nuocure 28) in 10 grams of an isoparaffin known as Isopar H which is a product sold by Humble Oil & Refining Company which contains isoparaffin hydrocarbons having between 20 and 23 carbon atoms per molecule, a distillation range of 340 to 371° F., and a flash point of 123° F. The resulting catalyst was then added to 100 grams of Dow Corning Silastic RTV 501, which is a dimethylpolysiloxane polymer having silica as a filler. The mixture cured to a hard rubber product in 12 minutes as compared to the use of tin octoate without the isoparaffin which required one hour for a cure. Dispersion was achieved with little mixing in contrast with tin octoate used without isoparaffin which required a relatively great amount of mixing.

EXAMPLE II

A catalyst was prepared in the manner described in Example I and was incorporated in the same proportions into 100 grams of General Electric RTV 40 which is a dimethylpolysiloxane having iron oxide as a filler. The curing time was reduced from fifteen minutes to ten minutes and dispersion of the catalyst was achieved with ease.

In addition to the superior dispersing and cure characteristic of the isoparaffin-catalyst compositions hereof discussed above a great variety of tests were conducted on the cure characteristics and the physical characteristics of the cured silicone prepolymers using what might be considered to be hydrocarbon solvents of kindred nature. In the tests readily available commercial silicone prepolymers were used. Those designated as Silastic are commercial room temperature curing or vulcanizing, (RTV) dimethylpolysiloxane prepolymers containing silica as a filler, obtained from Dow Corning Corporation and those designated RTV are also dimethylpolysiloxanes but contain iron oxide as a filler and were obtained from General Electric Company. In each instance 25 grams of the siloxane prepolymer was used and 10 grams of the solvent was used containing 2% of tin octoate as the catalyst. Thus the only variable in the tests was the solvent used. Isopar H has been defined above and Alkane 60 is a trade name of the Oronite Chemical Company for an alkylbenzene synthesized from petroleum hydrocarbons and having a boiling point between 300 and 310° F. Dodecane is an n-paraffin hydrocarbon boiling at 423° F. while octane boils at 257° F. and hexane boils at about 156° C. These boiling point temperatures are well representative of the operable boiling point temperatures of 150 to 500° F. for the isoparaffins hereof and bracket distillation range of the preferred Isopar H, namely 340 to 371° F.

In the table set out below the prepolymer-catalyst systems are evaluated on "cure time," tensile strength and hardness.

TABLE

| Resin (prepolymer) | Solvent (2% tin octoate) | Cure time | Tensile (p.s.i.) | Hardness (Durometer) |
|---|---|---|---|---|
| Silastic 521 | Isopar H | Instant | 170 | 20 |
| Do | Hexane | 2½ min | 22 | 8 |
| Do | Octane | 3 min | 28 | 10 |
| Do | Dodecane | 3 min | 31 | 10 |
| RTV 30 | Isopar H | 30 sec | 145 | 22 |
| RTV 30 | Hexane | 1½ min | 26 | 6 |
| RTV 30 | Octane | 3 min | 20 | 8 |
| RTV 30 | Dodecane | 3 min | 22 | 10 |
| RTV 11-Silastic 560 (50/50) | Isopar H | 3 min | 139 | 20 |
| RTV 11-Silastic 560 (50/50) | Alkane 60 | 5 min | 69 | 10 |

A study of the foregoing table demonstrates that in addition to superior dispersability of the known catalysts hereof in the isoparaffins hereof and the improved miscibility of the catalyst-solvent system with silicone prepolymers discussed above, the silicone prepolymers can be cured much more rapidly. The cured silicones are remarkably superior in strength and hardness when compared to the most nearly analogous available solvents.

It will, of course, be apparent to those skilled in the art that in addition to the convertible organopolysiloxanes employed in the foregoing examples, other organopolysiloxanes may be cured with the catalytic curing system of this invention without departing from the scope of the invention. Furthermore, other types of isoparaffins and metal carboxylic acid salts and various amounts of each may also be employed. Various fillers and modifying agents may be used and obviously the amount of filler may be varied considerably depending, for example, on the particular filler employed, its particle size, the specific convertible organopolysiloxane used, the purpose for which the finished product is to be used, etc.

I claim:

1. A catalyst composition for curing silicone rubber prepolymers which consists essentially of a catalytic amount of a tin fatty acid salt silicone curing catalyst dissolved in a solvent which is a substantially pure isoparaffin which has 10 to 32 carbon atoms and a boiling point range of from about 150° to 500° F.

2. The composition of claim 1, wherein said tin salt is tin octoate.

3. The composition of claim 1, wherein said isoparaffin has 18 to 28 carbon atoms.

4. The composition of claim 1, wherein said isoparaffin has 20 to 23 carbon atoms.

5. The composition of claim 1, wherein said isoparaffin has about 20 to 23 carbon atoms and a distillation range of about 340 to 371° F.

6. The catalyst composition of claim 1, wherein the ratio by weight of said metal salt to said isoparaffin is from 1:1 to 1:14.

References Cited

UNITED STATES PATENTS

| 2,588,393 | 3/1952 | Kauppi | 260—18(Si) |
| 2,843,555 | 7/1958 | Berridge | 260—18(Si) |
| 3,060,150 | 10/1962 | Preston | 252—431(Carb)X |

FOREIGN PATENTS

| 653,711 | 12/1962 | Canada | 260—18(Si) |

PATRICK P. GARVIN, Primary Examiner

U.S. Cl. X.R.

260—18, 33.6